US012059743B2

(12) United States Patent
Jung et al.

(10) Patent No.: US 12,059,743 B2
(45) Date of Patent: Aug. 13, 2024

(54) APPARATUS FOR LASER MACHINING AND A METHOD FOR COMPENSATING FOR ERRORS OF THE SAME

(71) Applicant: SAMSUNG DISPLAY CO., LTD., Yongin-si (KR)

(72) Inventors: Seunghwan Jung, Hwaseong-si (KR); Seokhwan Kim, Cheonan-si (KR); Sanghyun Jung, Hwaseong-si (KR); Woodong Kim, Daejeon (KR); Jaeil Kim, Asan-si (KR); Ilyoung Jeong, Suwon-si (KR); Jongkil Han, Bucheon-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 384 days.

(21) Appl. No.: 16/746,563

(22) Filed: Jan. 17, 2020

(65) Prior Publication Data
US 2020/0230738 A1  Jul. 23, 2020

(30) Foreign Application Priority Data

Jan. 23, 2019 (KR) .......................... 10-2019-0008836

(51) Int. Cl.
*B23K 26/03* (2006.01)
*B23K 26/04* (2014.01)
(Continued)

(52) U.S. Cl.
CPC ............ *B23K 26/032* (2013.01); *B23K 26/04* (2013.01); *B23K 26/083* (2013.01); *B23K 37/04* (2013.01);
(Continued)

(58) Field of Classification Search
CPC .. B23K 26/042; B23K 26/0853; B23K 26/00; B23K 26/046; B23K 26/70;
(Continued)

(56) References Cited

U.S. PATENT DOCUMENTS 9,415,461 B2 *  8/2016  Ito ........................ G02B 21/02
9,492,889 B2   11/2016  Suzuki et al.
(Continued)

FOREIGN PATENT DOCUMENTS

CN        102138097      7/2011
CN        102582274      7/2012
(Continued)

OTHER PUBLICATIONS

Olympus, E-M1 Mark II Instruction Manual, Sep. 2016. <https://cs.olympus-imaging.jp/en/support/imsg/digicamera/download/manual/omd/man_em1m2_e.pdf> (Year: 2016).*
(Continued)

*Primary Examiner* — Dana Ross
*Assistant Examiner* — Kuangyue Chen
(74) *Attorney, Agent, or Firm* — F. Chau & Associates, LLC

(57) ABSTRACT

An apparatus for laser machining is provided including a stage for supporting a substrate and a controller for generating an error compensation table, a motor driver for moving the stage, and an error compensation unit for generating a table to compensate for an error. The error compensation unit includes a grid plate disposed on the stage and an imaging unit for imaging the grid plate. The motor driver outputs a position synchronization signal to the imaging unit according to a position of the stage. The imaging unit receives the position synchronization signal from the motor driver and images the grid plate while moving the stage.

19 Claims, 7 Drawing Sheets

(51) Int. Cl.
  *B23K 26/08* (2014.01)
  *B23K 37/04* (2006.01)
  *G05B 19/402* (2006.01)

(52) U.S. Cl.
  CPC .. *G05B 19/402* (2013.01); *G05B 2219/36199* (2013.01)

(58) Field of Classification Search
  CPC .... B23K 26/702; B23K 26/083; B23K 26/04; B23K 26/032; B23K 37/04; B41M 5/262; G02B 13/0005; G02B 26/10; G05B 2219/36199; G05B 19/402; H01L 21/07; H01L 21/67276; H01L 21/67259; H01L 21/67092; H05B 6/68
  See application file for complete search history.

(56) References Cited

U.S. PATENT DOCUMENTS

| | | | |
|---|---|---|---|
| 2009/0075720 | A1 | 3/2009 | Mathis |
| 2014/0338960 | A1 | 11/2014 | Inoue et al. |
| 2017/0205623 | A1* | 7/2017 | Small .................... G02B 26/105 |
| 2018/0150058 | A1* | 5/2018 | Shapiro .............. G05B 19/4097 |

FOREIGN PATENT DOCUMENTS

| | | |
|---|---|---|
| CN | 103472685 | 12/2013 |
| CN | 105881103 | 8/2016 |
| CN | 106371102 | 2/2017 |
| CN | 107421442 | 12/2017 |
| CN | 107957582 | 4/2018 |
| CN | 108698164 | 10/2018 |
| KR | 10-1429866 | 8/2014 |

OTHER PUBLICATIONS

GlowForge Tech Specs, Feb. 2017 <https://web.archive.org/web/20170204045837/https://glowforge.com/tech-specs> (Year: 2017).*
Cree unveils 3-watt XLamp power LEDs (new version), Aug. 5, 2005 <https://www.ledsmagazine.com/leds-ssl-design/thermal/article/16696218/cree-unveils-3watt-xlamp-power-leds-new-version> (Year: 2005).*
Chinese Office Action Dated Nov. 1, 2023 for Application Serial No. 202010060932.0.

* cited by examiner

APPARATUS FOR LASER MACHINING AND A METHOD FOR COMPENSATING FOR ERRORS OF THE SAME

CROSS-REFERENCE TO RELATED APPLICATION

This application claims priority under 35 U.S.C. § 119 to Korean Patent Application No. 10-2019-0008836, filed on Jan. 23, 2019, in the Korean Intellectual Property Office (KIPO) the disclosure of which is incorporated by reference herein its entirety.

TECHNICAL FIELD

The present invention relates to an apparatus for laser machining and a method for compensating for errors of the same.

Discussion of Related Art

A substrate, such as a display substrate used in a mobile phone, is grooved or cut using a laser machining apparatus that irradiates a surface of the substrate. A laser machining apparatus that cuts or grooves the substrate may have a focus of the laser adjusted through the use of a lens. However, a laser emitted through the lens may become distorted due to an aberration of the lens, and the aberration of the lens may cause an error in the manufacturing process of a substrate.

SUMMARY

Embodiments of the present invention are directed to an apparatus for laser machining configured to compensate for aberration and movement related errors incurred during imaging of a continuously moving stage, and a method of implementing the same.

According to an exemplary embodiment of the present invention, an apparatus for laser machining is provided including a stage for supporting a substrate a controller for generating an error compensation table, a motor driver for moving the stage, and an error compensation unit for generating a table to compensate for an error. The error compensation unit includes a grid plate disposed on the stage and an imaging unit for imaging the grid plate. The motor driver outputs a position synchronization signal to the imaging unit according to a position of the stage. The imaging unit receives the position synchronization signal from the motor driver and images the grid plate while moving the stage.

According to an exemplary embodiment of the present invention, the motor driver outputs the position synchronization signal each time the stage moves a predetermined distance. The generated error compensation table includes a movement error. The movement error included in the movement error table refers to a difference between an actual distance traveled by the stage and the predetermined distance that occurs, during a delay between the output position synchronization signal and the imaging of the grid plate.

According to an exemplary embodiment of the present invention the controller analyzes an image imaged by the imaging unit to generate the error compensation table.

According to an exemplary embodiment of the present invention the controller outputs a movement compensation signal based on the error compensation table.

According to an exemplary embodiment of the present invention, the grid plate comprises a reflective material and a light from a lighting unit is provided to the grid by coaxial illumination.

According to an exemplary embodiment of the present invention, the lighting unit includes a light source that is driven with a power of at least 3 W.

According to an exemplary embodiment of the present invention, the imaging, unit includes a high-speed camera that images at a frame rate of at least 60 frames per second (fps).

According to an exemplary embodiment of the present invention, an apparatus for laser machining includes a laser beam generator disposed on the stage, a galvano scanner unit for receiving a laser beam from the laser beam generator, and a lens unit disposed between the galvano scanner unit and the stage.

According to an exemplary embodiment of the present invention, an apparatus for laser machining includes a lens unit including at least one of a telecentric lens or an F-theta lens.

According to an exemplary embodiment of the present invention, a method of compensating for errors of an apparatus for laser machining includes forming a grid plate on a mother plate, moving a stage on which the grid plate is disposed, generating a position synchronization signal each, time the stage moves a predetermined distance, imaging the grid plate in response to the position synchronization signal, and generating an aberration compensation table by calculating an error caused by aberration.

According to an exemplary embodiment of the present invention, a method of compensating for errors of an apparatus for laser machining includes a grid plate that is imaged in response to the position synchronization signal while the stage is moving.

According to an exemplary embodiment of the present invention, a method of compensating for errors of an apparatus for laser machining includes outputting a stage movement compensation signal after generating the aberration compensation table by calculating the error.

According to an exemplary embodiment of the present invention, a method of compensating for errors of an apparatus for laser machining includes imaging the grid plate in response to the position synchronization signal in which the grid plate is imaged at a frame rate of at least 30 frames per second (fps).

According to an exemplary embodiment of the present invention, a method of compensating for errors of an apparatus for laser machining includes the forming of a grid plate includes forming a grid on the mother plate.

According to an exemplary embodiment of the present invention, a method of compensating for errors of an apparatus for laser machining includes a grid plate including a reflective material, and a plurality of orthogonally intersecting lines.

According to an exemplary embodiment of the present invention, a method of compensating for errors of an apparatus for laser machining includes calculating an error caused by movement of the stage, after generating the aberration compensation table by calculating the error caused by aberration. Calculating the error caused by movement of the stage includes moving the stage discontinuously and rectilinearly during a first pass. A position synchronization signal is generated when the stage stops at a position corresponding to an intersection of the grid. The grid plate is imaged in response to the position synchronization signal while the stage is stopped. The stage is moved continuously during a second pass in which a position synchronization signal is generated when the stage moves a predetermined distance. The grid plate is imaged in response to the position synchronization signal while the stage is moving, and the error is calculated to generate a movement error compensation table.

According to an exemplary embodiment of the present invention, a method of compensating for errors of an apparatus for laser machining includes calculating an error caused by movement of the stage, wherein in calculating the error to generate the movement error compensation table, the error is filtered in an area in which the stage accelerates or decelerates.

According to an exemplary embodiment of the present invention, a method of compensating for errors of an apparatus for laser machining includes calculating an error caused by movement of the stage, wherein in calculating the error to generate the movement error compensation table, the error is calculated by comparing and analyzing the images of the grid plate, and the error is calculated in an area in which the stage moves at a constant velocity.

According to an exemplary embodiment of the present invention, a method of compensating for errors of an apparatus for laser machining is provided. The method includes positioning a grid on a stage and moving the stage discontinuously during a first pass. A position synchronization signal is generated during the first pass when the stage stops at a position corresponding to an intersection of the grid and the grid is imaged in response to the position synchronization signal while the stage is stopped. The stage is moved continuously during a second pass. During the second pass, a position synchronization signal is generated while moving the stage each time the stage moves a predetermined distance in a first direction. The grid is imaged in response to the position synchronization signal while the stage is moving. Each error is calculated to generate a movement error compensation table. The intersection of the grid corresponds to the predetermined distance.

According to an exemplary embodiment of the present invention, a method of compensating for errors of an apparatus for laser machining includes calculating the error to generate the movement error compensation table. The error is filtered in an area in which the stage accelerates or decelerates.

According to an exemplary embodiment of the present invention, a method of compensating for errors of an apparatus for laser machining includes calculating the error to generate the movement error compensation table. The error is calculated in an area in which the stage moves at a constant velocity.

The foregoing is illustrative only and is not intended to be in any way limiting. In addition to the illustrative aspects, embodiments and features described above, further aspects, embodiments and features will become apparent by reference to the drawings and the following detailed description.

BRIEF DESCRIPTION OF THE FIGURES

The above and other aspects and features of the present disclosure will be more clearly understood from the following detailed description taken in conjunction with the accompanying drawings, in which.

DETAILED DESCRIPTION OF THE EMBODIMENTS

Figure 1:
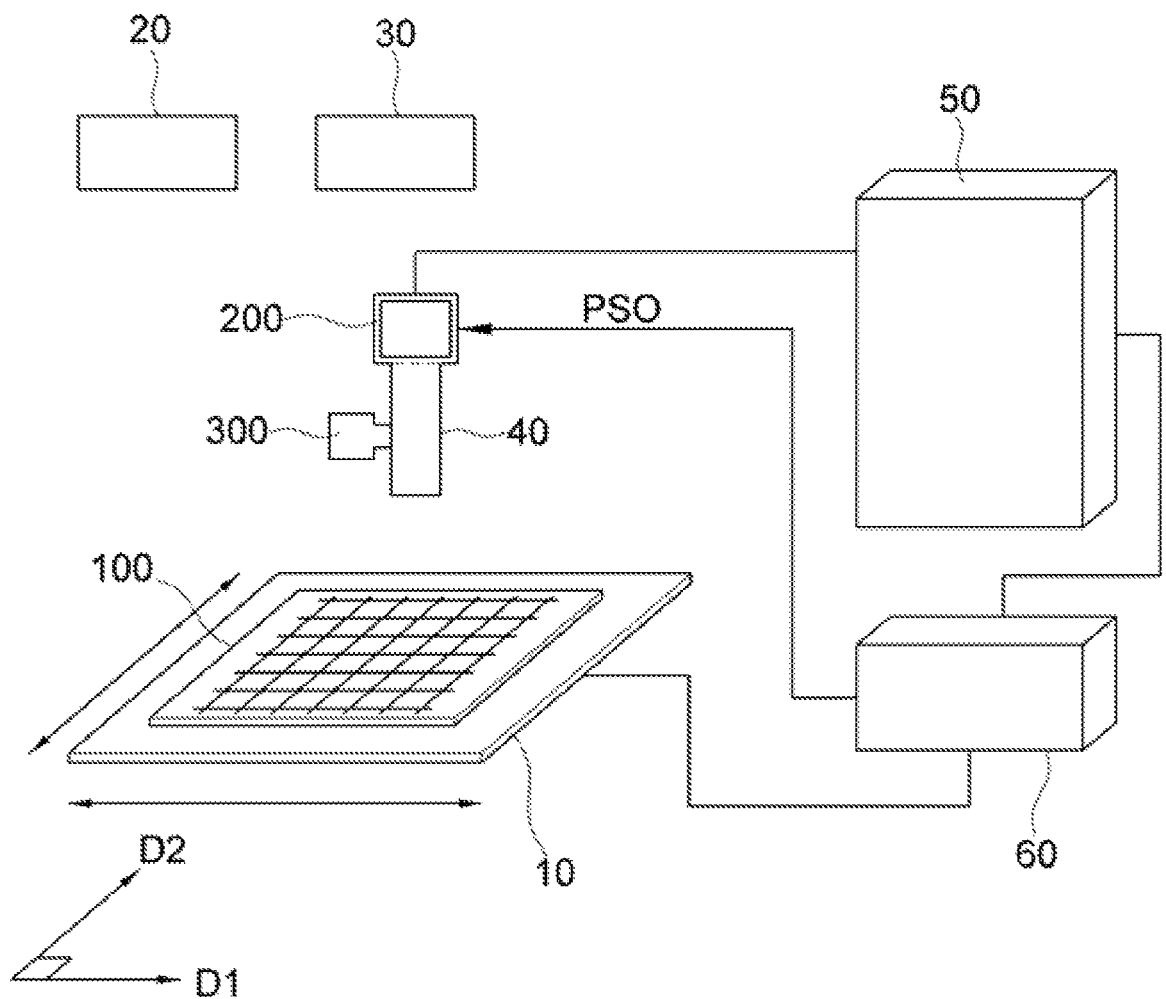
FIG. 1 is a schematic view illustrating a laser machining apparatus, according to an exemplary embodiment of the present invention.

The present invention will now be described more fully hereinafter with reference to the accompanying drawings in which various exemplary embodiments are shown. The present invention may, however, be embodied in many different forms, and should not be construed as limited to the exemplary embodiments set forth herein.

Like reference numerals may refer to like elements throughout the following description and figures. Also, the thickness, ratio, and dimensions of elements may be exaggerated in the figures to facilitate description of technical contents.

FIG. 1 is a schematic view illustrating a laser machining apparatus, according to an exemplary embodiment of the present invention. Hereinafter, the laser machining apparatus according to the exemplary embodiment of FIG. 1 will be described in detail.

A laser machining apparatus includes a stage 10, a laser beam generator 20, a galvano scanner unit 30, a lens unit 40, a controller 50, a motor driver 60, and an error compensation unit (an error compensation unit collectively may refer to a grid plate 100, an imaging unit 200, and a lighting unit 300).

The stage 10 is configured to move along a first direction (e.g., the D1 direction) and/or a second direction (e.g., D2 direction) that is perpendicular to the first direction (e.g., the D1 direction) by the motor driver 60, to be described in further detail below.

The laser beam generator 20 emits a laser beam toward the galvano scanner unit 30. The laser beam generator 20 may emit a laser beam continuously or discontinuously. The laser beam comprises a single beam or multiple beams.

According to an exemplary embodiment of the present invention, a beam splitter is positioned between the laser beam generator 20 and the galvano scanner unit 30. The beam splitter may split the laser beam into a plurality of laser beams, and guides paths of the respective laser beams.

The galvano scanner unit 30 may adjust a directional path of at least one of the plurality of laser beams that is incident to the galvano scanner unit 30 so as to direct the at least one laser beam to a desired position on a substrate to be processed. For example, the galvano scanner unit 30 directs the laser beam toward the substrate or a grid plate 100 disposed on the stage 10. The grid plate 100 may have a plurality of first and second lines. The first lines extend substantially in the first direction (e.g., the D1 direction) and are spaced apart from one another by first intervals in the second direction (e.g., the D2 direction). The second lines may extend substantially in the second direction (e.g., the D2 direction) and are spaced apart from one another at second intervals in the first direction (e.g., the D1 direction). Each of the first and second intervals represent a distance between an intersection of a first and a second line. However, the present invention is not limited thereto. For example, each unit or intersection of the grid may be comprised of a ring and a dot positioned at a center of the ring, and spaced apart from a perimeter of the ring by a radius of the ring. The galvano scanner unit 30 includes a plurality of galvano mirrors, and the plurality of galvano mirrors are disposed at predetermined angles with respect to each other. An angle of each galvano mirror may be adjusted to direct the laser beam toward a specific position of the substrate disposed on the stage 10.

The lens unit 40 may be disposed between the stage 10 and the galvano scanner unit 30. For example, the lens unit 40 is disposed between the galvano scanner, unit 30 and the substrate or the grid plate 100. The lens unit 40 condenses the laser beam provided from the galvano scanner unit 30 and directs the laser beam onto the substrate or the grid plate 100.

The lens unit 40 includes at least one condenser lens. Hereinbelow, it is assumed that the lens unit 40 includes one condenser lens. However, the present invention is not limited thereto. For example, the lens unit 40 may include a plurality of condenser lenses.

The condenser lens of the lens unit 40 condenses the laser beam generated from the laser beam generator 20 and guides the laser beam onto the substrate to be processed or the grid plate 100. For example, the condenser lens may be a telecentric lens or an F-theta (F-θ) lens. A focal length of the condenser lens is determined in consideration of, for example, the plurality of galvano mirrors included in the galvano scanner unit 30, the substrate to be processed, and the grid plate 100.

The substrate to be processed may include, for example, a substrate and/or glass. However, the present invention is not limited thereto. The substrate may be disposed on the stage 10.

The controller 50 controls operations of the stage 10, the laser beam generator 20, the galvano scanner unit 30, and/or the motor driver 60.

According to an exemplary embodiment of the present invention, the controller 50 analyzes images imaged by an imaging unit 200 to generate an error compensation table. An error compensation signal may be output to the galvano scanner unit 30 and/or the motor driver 60 based on the generated error compensation table.

The motor driver 60 may be configured to move the stage 10 along the first direction (e.g., the D1 direction) and/or the second direction (e.g., the D2 direction). The motor driver 60 outputs a signal for moving the stage 10.

The motor driver 60 is directly connected to the imaging unit 200, to be described below. The motor driver 60 outputs a position synchronization signal (which may also be referred to as a 'position synchronized output (PSO)' or a 'position sync signal') based on a position and/or a moving distance of the stage 10. The motor driver 60 outputs the PSO each time the stage 10 moves a predetermined distance (e.g., a designated number of first and/or second intervals) along the first direction e.g., the D1 direction) and/or the second direction (e.g., the D2 direction). For example, the motor driver 60 may, output the PSO each time the imaging unit 200 reaches an intersection of the first and second lines.

According to an exemplary embodiment of the present invention, the motor driver 60 outputs the PSO to the imaging unit 200 when a position of the stage 10 is synchronized with a position (e.g., an intersection) of the grid plate 100, and the imaging unit 200 captures an image.

An error compensation unit includes the grid plate 100, the imaging unit 200, and the lighting unit 300.

The grid plate 100 includes a grid formed by a laser machining apparatus. For example, the grid plate may be comprised of the first and the second lines.

The grid plate 100 may include a material having a high reflectance. For example, the grid plate 100 may be a mirror that includes aluminum (Al). Accordingly, the grid plate 100 may reflect a light emitted by the lighting unit 300, to be described below, with a high reflectance. For example, light reflected from a surface of the grid plate 100 may be provided to the imaging unit 200 by coaxial illumination. Thus the imaging unit 200 may accurately capture an image of the grid formed on the grid plate 100.

The imaging unit 200 captures an image of the grid plate 100 disposed on the stage 10. For example, the imaging unit 200 may receive the PSO each time the stage 10 moves a predetermined distance along the first direction (e.g., the D1 direction) and/or the second direction (e.g., the D2 direction) while the stage 10 continuously moves without stopping in the first direction (e.g., the D1 direction) and/or the second direction (e.g., the D2 direction), and captures an image of the grid plate 100.

The imaging unit 200 may include a high-speed camera. The high-speed camera of the imaging unit 200 may capture images at a speed of at least 30 frames per second (fps). For example, the high-speed camera of the imaging unit 200 may capture images at a speed of at least 60 fps. Accordingly, the imaging unit 200 may accurately capture an image of the grid plate 100 while the stage 10 is moving.

The lighting unit 300 provides light for more precise imaging of the substrate or the grid plate 100 disposed on the stage 10. For example, the lighting unit 300 may be a white light emitting diode (LED) light source. However, the present invention is not limited thereto, and the lighting unit 300 may include a light source of a different color.

The lighting unit 300 is disposed adjacent to the lens unit 40.

According to an exemplary embodiment of the present invention, the light source of the lighting unit 300 may have a power consumption of about 3 W or more and may prevent motion blur that occurs when the grid plate 100 is imaged while moving continuously.

Hereinafter, a method of compensating for errors that may be caused by aberration of a lens in a laser machining apparatus, according to an exemplary embodiment of the present invention, will be described in detail with reference to FIGS. 2 and 3.

Figure 2:
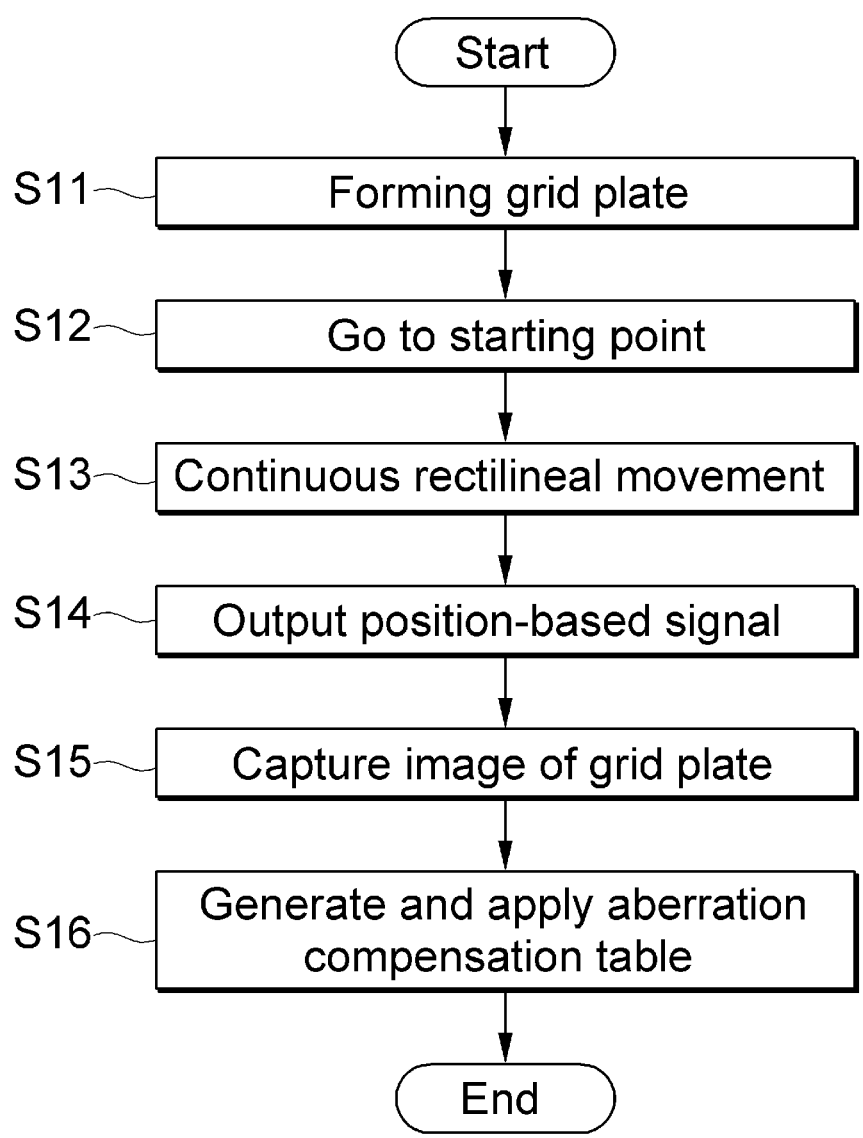
FIG. 2 is a flowchart illustrating an algorithm for generating an aberration error compensation table according to aberration of a laser machining apparatus, according to an exemplary embodiment of the present invention.
Figure 3:
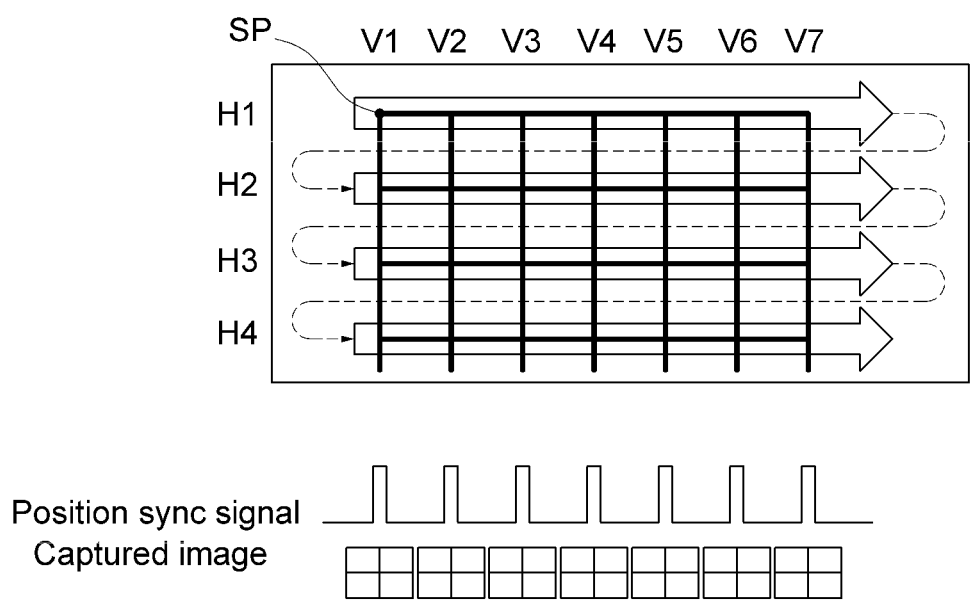
FIG. 3 is a tabular view illustrating an imaging path of a grid plate corresponding to a continuously moving stage, and positions at which synchronization signals of a laser machining apparatus are generated to capture an image, according to an exemplary embodiment of the present invention.

FIG. 2 is a flowchart illustrating an, algorithm for generating an error compensation table according to aberration of a laser machining apparatus, according to an exemplary embodiment of the present invention, and FIG. 3 is a tabular view illustrating an imaging path of a grid plate corresponding to a continuously moving stage, and positions at which position synchronization signals of a laser machining apparatus are generated to capture an image, according to an exemplary embodiment of the present invention.

First, a grid may be formed on a mother plate to form a grid plate (S11). The grid may be formed by etching performed by the laser machining apparatus, however the present inventive concept is not limited thereto. The grid may be formed by intersecting first and second lines extending along the first direction (e.g., the D1 direction) and the second direction (e.g., the D2 direction), respectively. Intersections of the grid may correspond to predetermined moving distances of the stage at which the motor driver 60 is programmed to generate, a PSO that prompts the imaging unit 200 to take an image. According to an exemplary embodiment of the present invention, a filter or lens of the imaging unit 200 may be designed to include preformed lines that operate as grid marks. As illustrated in FIG. 3, the laser machining apparatus may form a grid plate that includes a grid in the form of a 4-row and 7-column matrix including first to fourth horizontal lines H1, H2, H3, and H4 (also referred to herein as rows) and first to seventh vertical lines V1, V2, V3, V4, V5, V6, and V7 (also referred to herein as columns). However, the present invention is not limited thereto and the dimensions of the grid may be variously changed.

Thereafter, the motor driver 60 may move the stage 10 to the starting point (S12). For example, the motor driver 60 may move the stage 10 such that the imaging unit 200 is disposed at a position corresponding to one of the plurality of intersections of the horizontal and vertical lines of the grid which extend along the first direction (e.g., the D1 direction) and the second direction (e.g., the D2 direction), respectively. As illustrated in FIG. 3. the motor driver 60 may move the stage 10, and the imaging unit 200 may be disposed at a position corresponding to a start point SP located adjacent to a corner of the grid plate 100.

The motor driver 60 may move the stage 10 in the first direction (e.g., the D1 direction) and/or the second direction (e.g., the D2 direction) continuously and rectilinearly (S13). The motor driver 60 may rectilinearly move the stage 10 along the first direction (e.g., the D1 direction) and/or the second direction (e.g., the D2 direction) without stopping until the stage 10 reaches an end of the grid. For example, as illustrated in FIG. 3, the motor driver 60 may move the stage 10 continuously and rectilinearly without stopping along the first direction (e.g., the D1 direction from the start point SP, located adjacent to a corner of the grid plate 100, to a diagonal or opposite corner of the grid plate 100. Although the path of the stage 10 is shown as uniform continuous motion across each horizontal row, the present invention is not limited thereto. For example, the continuous rectilinear motion exhibited by the stage 10 may include zig-zagging across adjacent rows and/or columns, or may involve variable paths.

The motor driver 60 may output the PSO each time the stage 10 moves a predetermined distance along the first direction (e.g., the D1 direction) and/or second direction (e.g., the D2 direction) (S14). For example, as illustrated in FIG. 3, as the stage 10 moves continuously without stopping, the motor driver 60 may output the PSO each time the stave 10 is located at a position corresponding to an intersection of the grid targeted by the imagining unit 200.

The motor driver 60 may output the PSO to the imaging unit 200, and the imaging unit 200 may receive the PSO generated from the motor driver 60.

The imaging unit 200 may receive the PSO from the motor driver 60 and proceed to capture an image of the grid plate 100 (S15). The PSO input from the motor driver 60 may be applied as a trigger signal for the imaging unit 200 to capture an image. The imaging unit 200 may capture an image of the grid plate 100 with a fast shutter speed while the stage 10 is moving continuously, such that the motion blur may be substantially prevented in the captured image of the grid plate 100. For example, the imaging unit 200 may capture an image of the grid plate 100 with a shutter speed of about 10 µs.

According to an exemplary embodiment of the present invention, when the stage 10 is moved by a predetermined distance by the motor driver 60, the motor driver 60 may output the PSO to the imaging unit 200, and the imaging unit 200 may capture an image of the grid plate at an intersection between the first horizontal line H1 and the first to seventh vertical lines V1, V2, V3, V4, V5, V6, and V7, as illustrated in FIG. 3.

According to an exemplary embodiment of the present invention, since the stage 10 may move without stopping while the imaging unit 200 captures an image of the grid plate 100, a time taken to capture an image of the grid plate 100 may be greatly reduced, which will be described in detail below with reference to FIGS. 7 and 8.

The controller 50 may analyze locations of the imaged intersections between the first horizontal line H1 and the first to seventh vertical lines V1, V2, V3, V4, V5, V6, and V7 and locations of the intersections between the first horizontal line H1 and the first to seventh vertical lines V1, V2, V3, V4, V5, V6, and V7 to identify an aberration related error, and may generate an aberration compensation table for correcting the aberration error. According to the aberration compensation table, the controller 50 may output a position movement compensation signal for correcting movement of the motor driver 60, the galvano scanner unit 30 and/or the motor driver 60 so that the aberration error may be corrected (S16). An aberration error may refer to a deviation of a line of the grid or a converged laser beam being irradiated onto a surface of the substrate from an ideal path. For example, an image that shows a converged point of the laser beam that does not squarely overlap an intersection or exceeds bounds may indicate an aberration error.

Hereinafter, a method of compensating for movement errors of the stage 10 will be described in detail with reference to FIGS. 4, 5, and 6.

Figure 4:
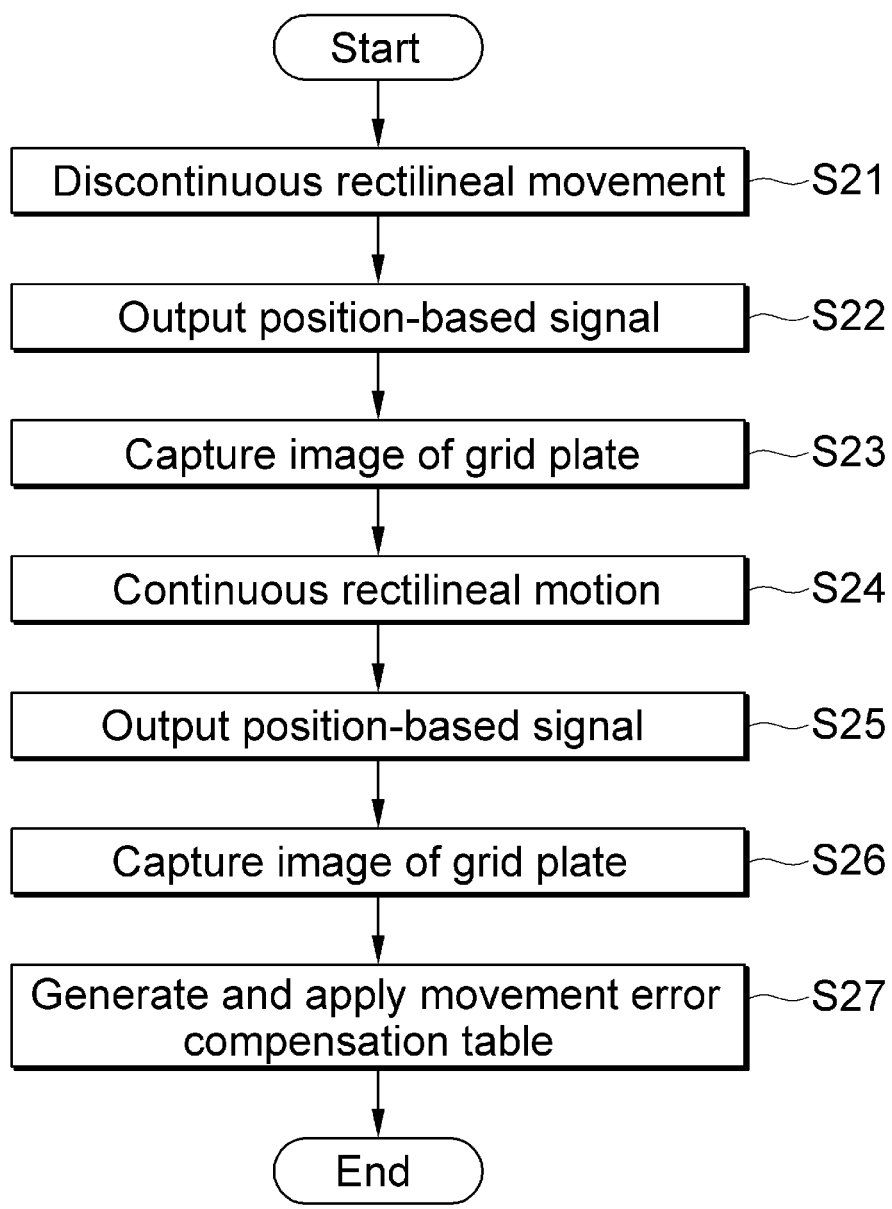
FIG. 4 is a flowchart illustrating an algorithm for generating a movement error compensation table according to movement of a stage of a laser machining apparatus, according to an exemplary embodiment of the present invention.
Figure 5:
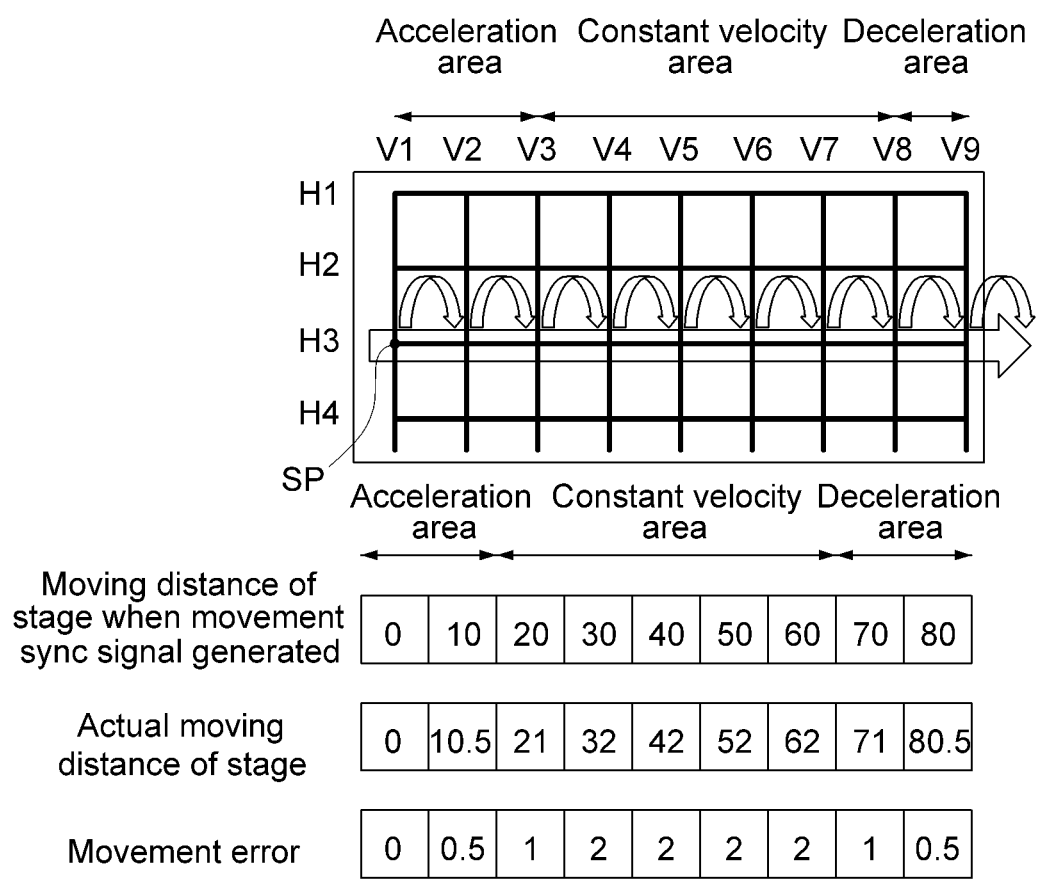
FIG. 5 is a tabular view illustrating the generation of the movement error compensation table of FIG. 4 including acceleration and deceleration areas, according to an exemplary embodiment of the present invention.

FIG. 4 is a flowchart illustrating an algorithm for generating a movement error compensation table based upon movement of a stage in a laser machining apparatus, according to an exemplary embodiment of the present invention;

FIG. 5 is a tabular view illustrating the generation of the movement error compensation table of FIG. 4 including acceleration and deceleration areas, according to an exemplary embodiment of the present invention.

According to an exemplary embodiment of the present invention, the imaging unit 200 may receive the PSO from the motor driver 60 and may capture an image of the grid plate 100. However, a delay may occur after the motor driver 60 outputs the PSO until the imaging unit 200 captures an image of the grid plate 100. Accordingly, an error may occur since there is a difference between a location of the imaging unit 200 when the PSO is generated and a location at which the imaging unit 200 actually captures an image. For example, when a moving velocity of the stage 10 is accelerated or decelerated, the aforementioned delay and error may increase. According to an exemplary embodiment of the present invention, a movement error compensation table for correcting the movement error described above may be generated.

Referring to FIG. 4, the motor driver 60 may move the stage 10 discontinuously and rectilinearly (S21). As illustrated in FIG. 5, the motor driver 60 may move the stage 10, and when the imaging unit 200 is located at positions corresponding to the intersections of the grid, the motor driver 60 may stop the stage 10 for a predetermined time, and then may move the stage 10 once again after the pr determined time has elapsed until the next intersection is reached. The curved arrow signifies a movement distance interval of the stage 10 between intersections when the movement sync signal is generated. The accompanying tables demonstrates a moving distance of the stage when a PSO is generated at each interval, an actual moving distance of the stage at each interval, and a movement error associated with each particular interval. The imaging unit 200 may be located at a position corresponding to an intersection of the grid. The motor driver 60 may stop the stage 10 for a predetermined time, and then move the stage 10 rectilinearly once again. For example, as illustrated in FIG. 5, each time the imaging unit 200 is located at a position corresponding to points at which the third horizontal line H3 respectively intersects first to ninth vertical lines V1, V2, V3, V4, V5, V6, V7, V8 and V9, the motor driver 60 may stop the stage 10 for a predetermined time, and then move the stage 10 rectilinearly once again.

The motor driver 60 may output the PSO each time the stage 10 moves by a certain distance (S22). As illustrated in FIG. 5, the motor driver 60 may generate the PSO each time the imaging unit 200 is located at an intersection of the grid, and the stage 10 may stop. For example, the motor driver 60 may generate the PSO each time the imaging unit 200 is located at a position corresponding to the points at which the third horizontal line H3 respectively intersects the first to ninth vertical lines V1, V2, V3, V4, V5, V6, V7, V8 and V9, and the stage 10 may stop.

According to an exemplary embodiment of the present invention, the imaging unit 200 may receive the PSO, and may capture an image of the grid plate 100. For example, as illustrated in FIG. 5, each time the imaging unit 200 is located at a position corresponding to the points at which the third horizontal line H3 respectively intersects the first to ninth vertical lines V1, V2, V3, V4, V5, V6, V7, V8 and V9, the stage 10 may stop for a predetermined time. The imaging unit 200 may receive the PSO from the motor driver 60, and may capture an image of the grid plate 100 at the points where the third horizontal line H3 respectively intersects the first to ninth vertical lines V1, V2, V3, V4, V5, V6, V7, V8 and V9.

The motor driver 60 may move the stage 10 in continuous rectilinear motion (S24). For example, the motor driver 60 may move the stage 10 rectilinearly without, stopping until it reaches an end of the grid. For example, as illustrated in FIG. 5, the motor driver 60 may move the stage 10 from the start point SP rectilinearly and continuously without stopping.

According to an exemplary embodiment of the present invention, the motor driver 60 may output the PSO each time the stage 10 moves by a predetermined distance (S25). For example, the motor driver 60 may generate the PSO each time the imaging unit 200 is located at a position corresponding to an intersection of the grid. For example, while the stage 10 is moving, the motor driver 60 outputs the PSO to the imaging unit 200 each time the stage 10 moves by a predetermined distance (e.g., an interval between intersections).

The imaging unit 200 that has received the PSO from the motor driver 60 may capture an image of the grid plate 100 (S26). For example, while the stage 10 moves without stopping, the imaging unit 200 may receive the PSO and capture an image of the grid plate 100 each time the stage 10 moves by a predetermined distance (e.g., an interval between intersections). For example, the imaging unit 200 may receive the PSO each time the imaging unit 200 is located at a position corresponding to points at which the third horizontal line respectively intersects the first to ninth vertical lines V1, V2, V3, V4, V5, V6, V7, V8 and V9, and may capture an image of the grid plate 100 at the points at which the third horizontal line H3 respectively intersects the first to ninth vertical lines V1, V2, V3, V4, V5, V6, V7, V8 and V9.

The controller 50 may generate a movement error compensation table and apply it to correct an error (S27). As illustrated in FIG. 5, the controller 50 compares and analyzes the corresponding captured images from the continuous and discontinuous segments to identify movement errors between them, and may generate a movement error compensation table for correcting the movement errors during particular intervals, including intervals disposed in the acceleration and deceleration areas. According to the movement error compensation table, a position movement compensation signal for correcting movement of the motor driver 60 may be output to the galvano scanner unit 30 and/or the motor driver 60.

Figure 6:
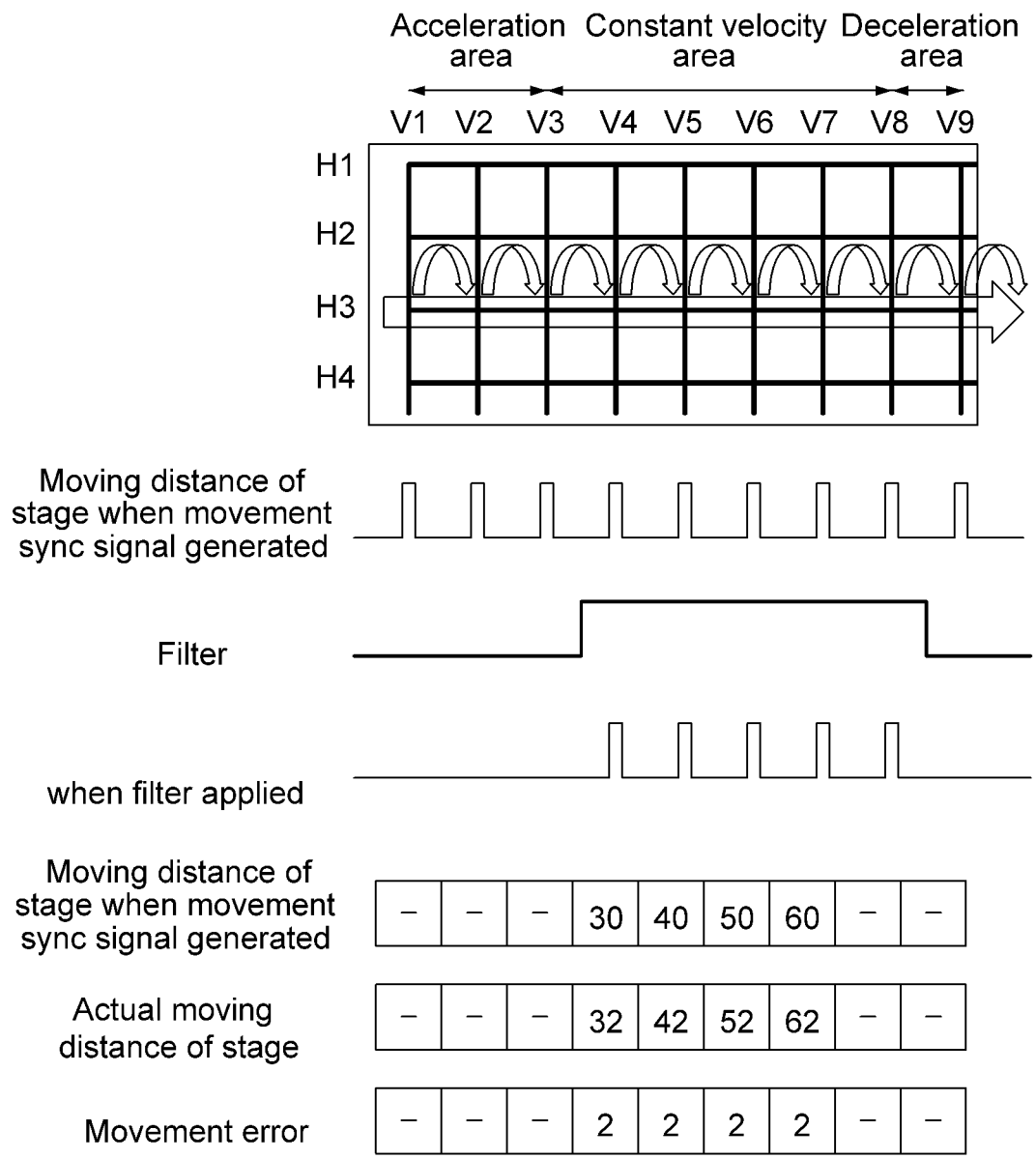
FIG. 6 is a tabular view illustrating the generation of a filtered version of the movement error compensation table of FIG. 5, according to an exemplary embodiment of the present invention.

FIG. 6 is a tabular view illustrating the generation of a filtered version of the movement error compensation table of FIG. 5, according to an exemplary embodiment of the present invention.

The imaging unit 200 may receive the PSO from the motor driver 60 and may capture an image of the grid plate 100. A delay may occur after the motor driver 60 outputs the PSO until the imaging unit 200 captures an image of the grid plate 100. Accordingly, a movement related imaging error may occur since there is a movement error between a location of the stage 10 when the PSO is generated and a location at which the imaging unit 200 actually captures an image. For example, as illustrated in FIGS. 5 and 6, when a moving velocity of the stage 10 varies (acceleration area and deceleration area are present), the aforementioned imaging delay and associated movement error may increase. On the other hand, when the moving velocity of the stage 10 is constant (constant velocity area), aforementioned imaging delay and associated movement error between intersections may be constant. According to an exemplary embodiment of the present invention, data pertaining to the acceleration area and the deceleration area of the stage 10 may be filtered to block the movement synchronization signal at the acceleration area and the deceleration area of the stage 10, thereby facilitating easy correction of movement errors. Accordingly, the aforementioned movement error compensation table may be generated only for the constant velocity area in which the movement error is constant, and the constant movement error of the constant velocity area may be corrected relatively easily. Designated imaging times of the stage 10 may be adjusted by the motor driver 60 in the constant velocity region in consideration of calculated movement errors, thereby accurately imaging intersections and avoiding related imaging errors. For example, in consideration of the anticipated imaging delay times, a PSO may be output by the motor driver 60 either earlier or later than a predetermined movement distance of the stage 10 (e.g., an associated intersection). The modified PSO timing may be determined by the controller 50.

Figure 7:
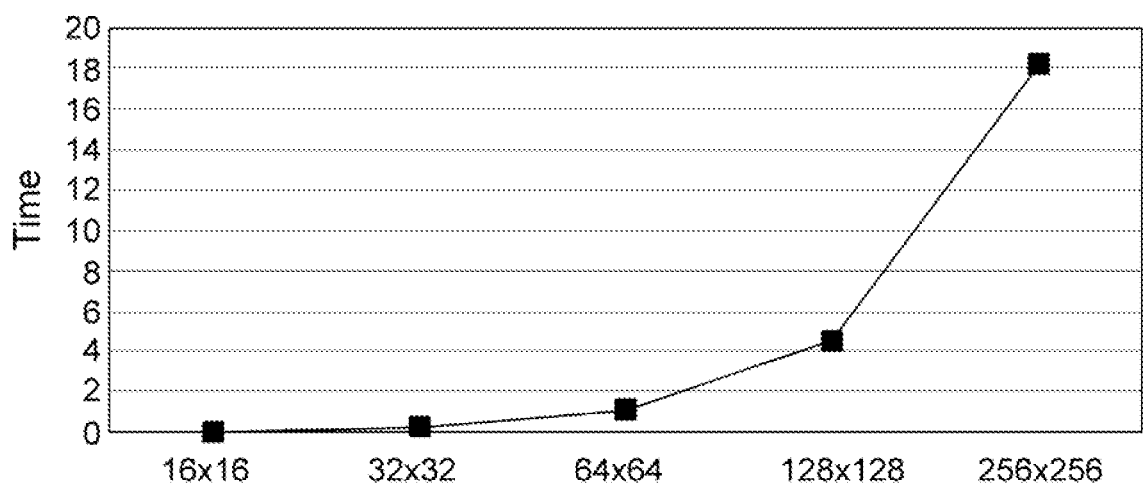
FIG. 7 is a comparative graphical view illustrating a processing time according to resolution of a grid plate in a comparative laser machining apparatus.
Figure 8:
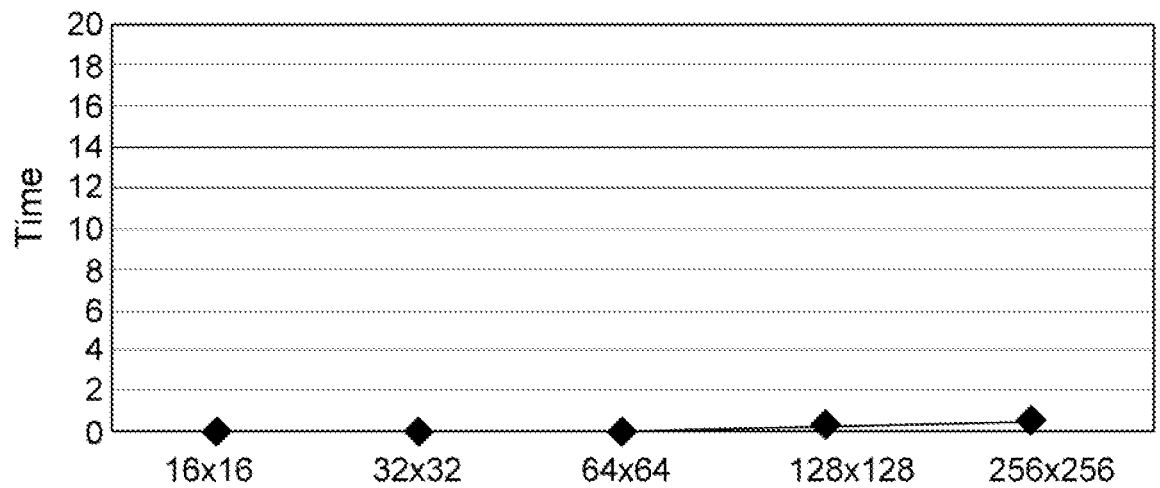
FIG. 8 is a graphical view illustrating a processing time according to resolution of a grid plate in a laser machining apparatus, according to an exemplary embodiment of the present invention.

FIG. 7 is a graphical view illustrating a processing time according to resolution of a grid used in a comparative laser machining apparatus, and FIG. 8 is a graphical view illustrating a processing time according to resolution of a grid in a laser machining apparatus, according to an exemplary embodiment of the present invention.

FIG. 7 shows a comparative graph illustrating the time taken to correct movement errors at intersection points of a grid where the stage 10 moves discontinuously and rectilinearly stopping each time the imaging unit 200 is located at a position corresponding to an intersection point of the grid. In a case where the stage 10 moves discontinuously and rectilinearly as the motor driver 60 stops, the stage 10 each time the imaging unit 200 is located at a position corresponding to an intersection point of the grid, the time taken to correct movement errs between the intersection points of the grid is proportional to the square of the resolution of the grid. As illustrated in Table 1, as the resolution increases, the time required to correct the errors increases exponentially.

TABLE 1

| Grid resolution | 4K (65 × 65) | 64K (257 × 257) |
|---|---|---|
| Precision of distance between grids | <±10 μm | <±7 μm |
| The number of times stage moves | 4,225 times | 66,079 times |
| Time | ≥60 minutes | ≥15 hours |

FIG. 8 shows a graph illustrating the time taken to correct movement errors at intersections of a grid according to resolution, where the imaging unit 200 captures an image of the grid plate 100 while the stage 10 moves continuously. When the imaging unit 200 captures an image of the grid plate 100 while the stage 10 moves continuously, the time taken to correct errors detected at the intersection points of the grid is linearly proportional to the resolution of the grid. As shown in Table 2, the time taken to correct errors according to the laser machining apparatus and method of compensating for errors described herein is much lower at all grid resolutions as compared to the case where the stage 10 moves discontinuously and rectilinearly, as depicted in Table 1 shown above.

TABLE 2

| Grid resolution | 4K (65 × 65) | 64K (257 × 257) |
|---|---|---|
| Precision of distance between grids | <±10 μm | <±7 μm |
| The number of times stage 10 moves | 65 times | 257 times |
| Time | ≥7 minutes | ≥0.5 hours |

Accordingly, the present invention reduces the amount of time required for precisely manufacturing display devices, and productivity and accuracy may thereby be increased.

While the exemplary embodiments of the present invention have been shown and described above, it will be understood by one of ordinary skill in the art that modifications and variations in form and detail may be made therein without departing from the spirit and scope of the present invention.

What is claimed is:

1. An apparatus for laser machining, comprising:
a stage for supporting a substrate;
a controller for generating an aberration error compensation table, wherein the aberration error compensation table includes an aberration error caused by the apparatus for laser machining;
a motor driver for moving the stage; and
an error compensation unit,
wherein the error compensation unit comprises:
a grid plate disposed on the stage; and
an imaging unit for imaging the grid plate,
wherein the motor driver outputs a position synchronization signal to the imaging unit each time the stage moves a predetermined distance, and
wherein the imaging unit is disposed at one or more positions corresponding to a plurality of intersections of the grid plate, receives the position synchronization signal from the motor driver and images the grid plate while the motor driver is moving the stage and outputs images of the plurality of intersections of the grid plate to the controller; and
wherein the controller generates the aberration error compensation table, and wherein the aberration error compensation table is based on the images of the plurality of intersections of the grid plate imaged while the stage is moving, and a movement error compensation table, and
wherein the movement error compensation table includes a movement error, and
wherein the movement error is calculated by comparing images of the plurality of intersections of the grid plate imaged while the stage is moving and corresponding to images of the plurality of intersections of the grid plate imaged while the stage is stopped.

2. The apparatus for laser machining of claim 1, wherein the motor driver outputs the position synchronization signal each time the stage moves the predetermined distance.

3. The apparatus for laser machining of claim 1, wherein the controller analyzes an image imaged by the imaging unit to generate the aberration error compensation table.

4. The apparatus for laser machining of claim 3, wherein the controller outputs compensation signals based on the aberration error compensation table.

5. The apparatus for laser machining of claim 1, wherein the grid plate comprises a reflective material and a light is provided to the grid plate by coaxial illumination, wherein the light is from the lighting unit.

6. The apparatus for laser machining of claim 1, further comprising lighting unit, the lighting unit comprises a light source that is driven with a power of at least 3 W.

7. The apparatus for laser machining, of claim 1, wherein the imaging unit comprises a high-speed camera that images at a frame rate of at least 60 frames per second (fps).

8. The apparatus for laser machining of claim 1, further comprising:
a laser beam generator;
a galvano scanner unit for receiving a laser beam from the laser beam generator; and
a lens unit disposed between the galvano scanner unit and the stage.

9. The apparatus for laser machining of claim 8, wherein the lens unit comprises at least one of a telecentric lens or an F-theta lens.

10. A method of compensating for errors of an apparatus for laser machining, the method comprising:
forming a grid plate on a mother plate;
moving a stage on which the grid plate is disposed;
generating a distance-based position synchronization signal each time the stage moves a predetermined distance;
imaging the grid plate in response to the distance-based position synchronization signal using an imaging unit while the stage is moving, wherein the imaging unit outputs images of a plurality of intersections of the grid plate;

generating an aberration error compensation table, wherein the aberration error compensation table is based on the images of the plurality of intersections of the grid plate imaged while the stage is moving and a movement error compensation table, wherein the aberration error compensation table includes an aberration error caused by aberration of the apparatus for laser machining; and wherein the generated movement error compensation table includes a movement error, and wherein the movement error is calculated by comparing images of the plurality of intersections of the grid plate imaged while the stage is moving and corresponding to images of the plurality of intersections of the grid plate imaged while the stage is stopped.

11. The method of claim 10, wherein the grid plate is imaged in response to the distance-based position synchronization signal while the stage is moving.

12. The method of claim 10, further comprising:

outputting a stage movement compensation signal after generating the aberration error compensation table by calculating the aberration error.

13. The method of claim 10, wherein in the imaging the grid plate in response to the distance-based position synchronization signal, the grid plate is imaged at a frame rate of at least 30 frames per second (fps).

14. The method of claim 10, wherein the forming the grid plate includes forming a grid on the mother plate, wherein the grid plate comprises a reflective material, and wherein the grid plate includes a plurality of orthogonally intersecting lines.

15. The method of claim 10, the movement error is filtered in an area which the stage accelerates or decelerates.

16. The method of claim 10, wherein the movement error is calculated in an area in which the stage moves at a constant velocity.

17. A method of compensating for errors of an apparatus for laser machining, the method comprising:

positioning a grid on a stage;

moving the stage discontinuously during a first pass, wherein the moving the stage discontinuously during the first pass comprises:

generating a position-based position synchronization signal when the stage stops at a position corresponding to an intersection of the grid;

imaging the grid in response to the position-based position synchronization signal while the stage is stopped using an imaging unit, wherein the imaging is disposed at one or more positions corresponding to a plurality of intersections of the grid during the first pass;

moving the stage continuously during a second pass, wherein the moving the stage continuously during the second pass comprises:

generating a distance-based position synchronization signal while moving the stage each time the stave moves a predetermined distance in a first direction;

imaging the grid in response to the distance-based position synchronization signal while die stage is moving using the imaging unit, wherein the imaging unit is disposed at the one or more positions corresponding to the plurality of intersections of the grid during the second pass; and calculating a movement error to generate a movement error compensation table by comparing images of the plurality of intersections of the grid plate imaged while the stage is moving and corresponding images of the plurality of intersections of the grid plate imaged while the stage is stopped.

18. The method of claim 17, wherein in calculating the error to generate the movement error compensation table, the error is filtered in an area in which the stage accelerates or decelerates.

19. The method of claim 17, wherein in calculating the error to generate the movement error compensation table, the error is calculated in an area in which the stage moves at a constant velocity.

* * * * *